United States Patent
Frankel et al.

(10) Patent No.: US 7,721,229 B2
(45) Date of Patent: May 18, 2010

(54) DISPLAYING OVERLAID CALENDARS

(75) Inventors: Glenn Frankel, Atlanta, GA (US); Richard Henry Leukart, III, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/599,249

(22) Filed: Nov. 14, 2006

(65) Prior Publication Data

US 2008/0115088 A1 May 15, 2008

(51) Int. Cl.
*G06F 3/048* (2006.01)

(52) U.S. Cl. .................. 715/835; 715/823; 715/853; 715/963

(58) Field of Classification Search .......... 715/835, 715/963
See application file for complete search history.

(56) References Cited

U.S. PATENT DOCUMENTS

| | | | |
|---|---|---|---|
| 5,960,406 A * | 9/1999 | Rasansky et al. ............... 705/9 |
| 6,141,005 A | 10/2000 | Hetherington et al. ...... 345/333 |
| 6,369,840 B1 | 4/2002 | Barnett et al. ............... 345/853 |
| 6,466,236 B1 | 10/2002 | Pivowar et al. .............. 345/835 |
| 6,785,868 B1 | 8/2004 | Raff ........................... 715/530 |
| 7,039,596 B1 | 5/2006 | Lu ................................. 705/8 |
| 2002/0191035 A1 * | 12/2002 | Selent ........................ 345/866 |
| 2003/0154116 A1 | 8/2003 | Lofton ........................... 705/8 |
| 2003/0167664 A1 | 9/2003 | Mullinax ..................... 40/107 |
| 2004/0109025 A1 | 6/2004 | Hullot et al. ................ 345/764 |
| 2004/0268270 A1 | 12/2004 | Hill et al. .................... 715/963 |
| 2005/0039142 A1 * | 2/2005 | Jalon et al. .................. 715/823 |
| 2005/0057584 A1 * | 3/2005 | Gruen et al. ................ 345/752 |
| 2007/0256035 A1 * | 11/2007 | Matsuzawa et al. ......... 715/864 |

OTHER PUBLICATIONS

Joe Tullio et al., "Augmenting Shared Personal Calendars", http://delivery.acm.org/10.1145/580000/571988/p11-tullio.pdf?key1=571988&key2=1580450611&coll=GUIDE&dl=portal.ACM&CFID=11111111&CFTOKEN=2222222, 2002, vol. 4, Issue 2, pp. 11-20.
"Shared Calendars Get Major Boost With ClearSync 1.0", http://www.itweb.co.za/sections/software/2006/0609262100.asp?A=WIR&S=Business%20Wire&T=News&O=ST, Sep. 26, 2006, 10 pages.
"Zimbra Collaboration Suite", http://www.tcomeng.com/ZimbraDataSheet/pdf, 2005, 2 pages.

* cited by examiner

*Primary Examiner*—Joshua D Campbell
*Assistant Examiner*—Stephen Alvesteffer
(74) *Attorney, Agent, or Firm*—Merchant & Gould

(57) ABSTRACT

Displaying calendars may be provided. In response to a first input initiated by a user, a first calendar may be displayed comprising a user's calendar. Next, a second calendar may be overlaid over the first calendar. The second calendar may be displayed transparently with respect to the first calendar. Then, a third calendar may be displayed beside the first calendar. The second or third calendar may each comprise an event calendar, a project calendar, or a calendar of another user not associated with the first calendar. In addition, a second user initiated input may be received selecting an entry on the second calendar. In response to the received second user initiated input, the second calendar may be redisplayed not transparently with respect to the first calendar. Moreover, in response to the received second user initiated input, the first calendar may be redisplayed transparently with respect to the redisplayed second calendar.

20 Claims, 4 Drawing Sheets

DISPLAYING OVERLAID CALENDARS

BACKGROUND

Many people use a calendar application program to keep their personal or business calendar. In some situations, a calendar application user may wish to compare, for example, the user's personal calendar to another calendar. For example, the user may wish to compare the user's personal calendar to a sports calendar showing all the scheduled games associated with a particular sports team. In order to make this comparison, the user may print the sports calendar and then compare the printed sports calendar to the user's own personal calendar. The conventional comparison strategy, however, does not provide a user friendly calendar comparison nor does it provide a convenient way to add events from one calendar to another calendar.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Displaying calendars may be provided. In response to a first input initiated, for example, by a user, a first calendar may be displayed. The first calendar may comprise, for example, the user's calendar. Next, a second calendar may be overlaid the first calendar. The second calendar's background may be displayed transparently so that information on the first calendars and the second calendar may be seen simultaneously. Then, a third calendar may be displayed beside the first calendar. The second or third calendar, for example, may each comprise an event calendar, a project calendar, or a calendar of another user not associated with the first calendar. Through user-initiated input, for example, a user may control which calendar appears in a "foreground" and which appears in a "background" at any given time.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
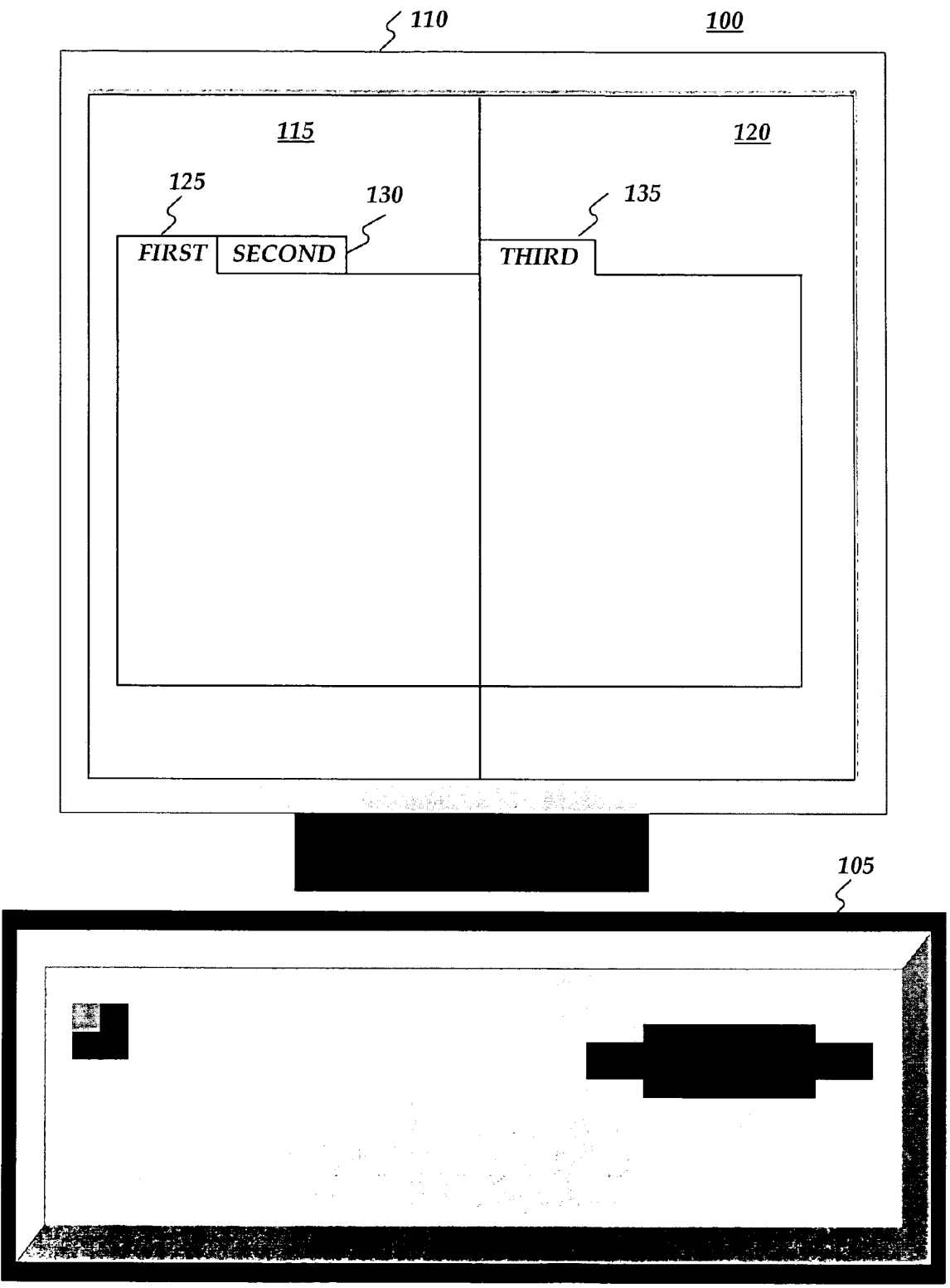
FIG. 1 shows an example display output in an operation environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Displaying overlaid calendars may be provided. In conventional systems, a calendar application user may wish to compare the user's personal calendar, for example, to a sports calendar showing all the scheduled games associated with a particular sports team. In order to make this comparison, the user may print the sports calendar and then compare the printed sports calendar to the user's own personal calendar.

Consistent with embodiments of the invention, in an overlay format, a user can see how another calendar relates to the user's calendar before permanently adding items from the other calendar to the user's calendar. By using color and transparency in the overlay format, the user may compare items on the user's own calendar with those on the other calendar. The user may select an item on one calendar and then add the selected item to the user's calendar. Furthermore, overlaid calendars may be toggled between the foreground/background by clicking on items from a given calendar or by clicking on the calendars' header tabs.

FIG. 1 shows an example display output in an operating environment 100 consistent with embodiments of the present invention. As shown in FIG. 1, a computing device 105 may have an associated a display 110 displaying a first area 115 and a second area 120. Display 110 may comprise one of output devices 414 descried in more detail below with respect to FIG. 4. First area 115 may be configured to provide a visual comparison between a first calendar 125 and a second calendar 130 by overlaying first calendar 125 with second calendar 130. First calendar, for example, may comprise a user's personal calendar. Second calendar 130 may be displayed transparently with respect to first calendar 125. In addition, second area 120 may be displayed beside first area 115 on display 110. Second area 120 may provide a visual comparison of the overlaid first calendar 125 and second calendar 130 to a third calendar 135 displayed in second area 120.

Furthermore, consistent with embodiments of the invention, by selecting (e.g. clicking) on calendar items, a source calendar may surface, for example, with rich color (including, for example, all category coloring in that calendar). In addition, those calendars not in the forefront may take on a percent transparency of the color they are assigned by the order they are added into the overlay state. In the example above, second calendar 130 (in first area 115) may show all second calendar entries in a faded blue color, for example. By clicking on an entry in second calendar 130, calendar entries in first calendar 125 may be placed into a faded state and calendar entries in second calendar 130 may be placed in a full color state. In other words, first calendar 125 and second calendar 130 may be toggled between the foreground/background of first area 115 by clicking on items in first calendar 125 and second calendar 130. In this way, entries from first calendar 125 and second calendar 130 may be compared in an overlay manner and can also be compared to third calendar 135 in a side-by-side manner.

Figure 2:
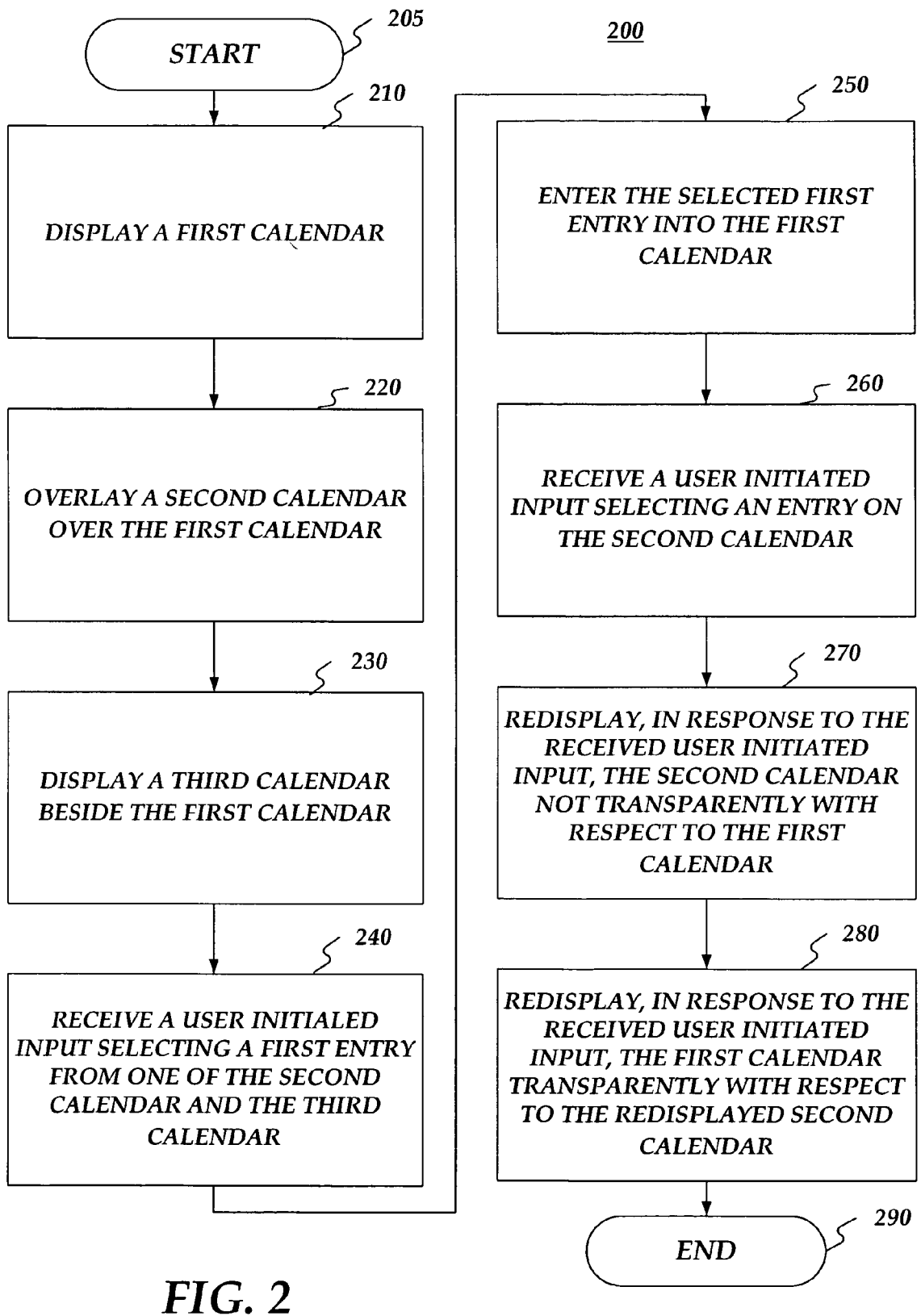
FIG. 2 is a flow chart of a method for displaying calendars.

FIG. 2 is a flow chart setting forth the general stages involved in a method 200 consistent with an embodiment of the invention for displaying calendars. Method 200 may be implemented using computing device 105 as described in more detail below with respect to FIG. 4. Ways to implement the stages of method 200 will be described in greater detail below. Method 200 may begin at starting block 205 and proceed to stage 210 where computing device 105 may display a first calendar 125. For example, first calendar 125 may comprise a user's calendar. First calendar may be displayed in response to an input initiated by the user. For example, the user may be running a calendar application 420 on computing device 105 as described in more detail below with respect to FIG. 4. The user may initiate the input to calendar application 420 indicating the user's desire to display the user's personal calendar. In response, calendar application 420 may display first calendar 125 in first area 115 on display 110.

From stage 210, where computing device 105 displays first calendar 125, method 200 may advance to stage 220 where computing device 105 may overlay a second calendar 130 over first calendar 125. Second calendar 130 may be displayed transparently with respect to first calendar 125. For example, second calendar 130 may comprise an event calendar, a project calendar, and a calendar of another user not associated with first calendar 125. The aforementioned are examples and second calendar 130 may comprise any calendar.

By displaying the background of a second calendar 130 transparently with respect to first calendar 125, second calendar, not being in area 115's forefront, may take on a percent transparency of the color it would otherwise be displayed. In this example, second calendar 130 (in first area 115) may show all second calendar entries in a faded blue color, for example. Furthermore, by clicking on an entry in second calendar 130, calendar entries in first calendar 125 may be placed into a faded state (background) and calendar entries in second calendar 130 may be placed in a full color state (foreground). In this way, second calendar 130 may be toggled to the foreground of area 115 and first calendar 125 may be toggled to the background of area 115.

Once computing device 105 overlays second calendar 130 over first calendar 125 in stage 220, method 200 may continue to stage 230 where computing device 105 may display a third calendar 135 in second area 120 beside first calendar 125. For example, third calendar 135 may comprise an event calendar, a project calendar, and a calendar of another user not associated with first calendar 125. The aforementioned are examples and third calendar 135 may comprise any calendar. In this way, for example, the user may compare the user's calendar (e.g. first calendar) to one or more other calendars (e.g. second calendar in an overlay format and third calendar in a side-by-side format).

Consistent with embodiments of the invention, the user may download an event calendar of a sports team showing all the team's games. The user may open the downloaded calendar in calendar application 420. The user may then display the downloaded calendar in an overlay format (e.g. as second calendar 130). In addition, the user may display the downloaded calendar in a side-by-side format (e.g. as third calendar 135) or switch between the two different formats. This way, the user can see the conflicts between games and the user's other commitments shown in the user's personal calendar (e.g. first calendar 125).

In addition, the user may download a project calendar that outlines phases and milestones for a particular project. The user may open the downloaded project calendar in calendar application 420. The user may overlay the project calendar (e.g. second calendar 130) over the user's calendar (e.g. first calendar 125) so that the user may see how the milestones on the project calendar may affect the user's work. In addition, the user may display, in a side-by-side format, the project calendar (e.g. third calendar 135) beside the user's calendar (e.g. first calendar 125) for the same reason. The user may not want to add the whole project calendar to the user's calendar permanently because this may tend to clutter the user's calendar. However, the user may wish to see information from the project calendar frequently in the overlay or side-by-side format.

Furthermore, the user may wish to schedule a meeting with a co-worker. The user may download and open the co-worker's calendar, but may find it difficult to find a time in which both the user and the co-worker are free. Consequently, the user may display the co-worker's calendar in the overlay format (e.g. second calendar 130) or in a side-by-side format (e.g. third calendar 130). In this way, the user may more easily compare the user's calendar to the co-worker's calendar.

After computing device 105 displays third calendar 115 beside first calendar 125 in stage 230, method 200 may proceed to stage 240 where computing device 105 may receive a user initialed input selecting a first entry from one of second calendar 130 or third calendar 135. For example, the user may select an entry corresponding to a game from a sporting event calendar displayed in an overlay format (e.g. second calendar 130). Or the user may select an entry corresponding to a project milestone from a project calendar displayed in a side-by-side format (e.g. third calendar 135). The aforementioned are examples and the user may select other types of event from other calendars displayed in various format combination between overlay and side-by-side.

From stage 240, where computing device 105 receives the user initialed input, method 200 may advance to stage 250 where computing device 105 may enter the selected first entry into first calendar 125. From the above example, calendar application 420 may enter the selected entry corresponding to the game from the sporting event calendar into the user's calendar (e.g. first calendar 125). Or calendar application 420 may enter the select entry corresponding to the project milestone from the project calendar into the user's calendar (e.g. first calendar 125).

Figure 3:
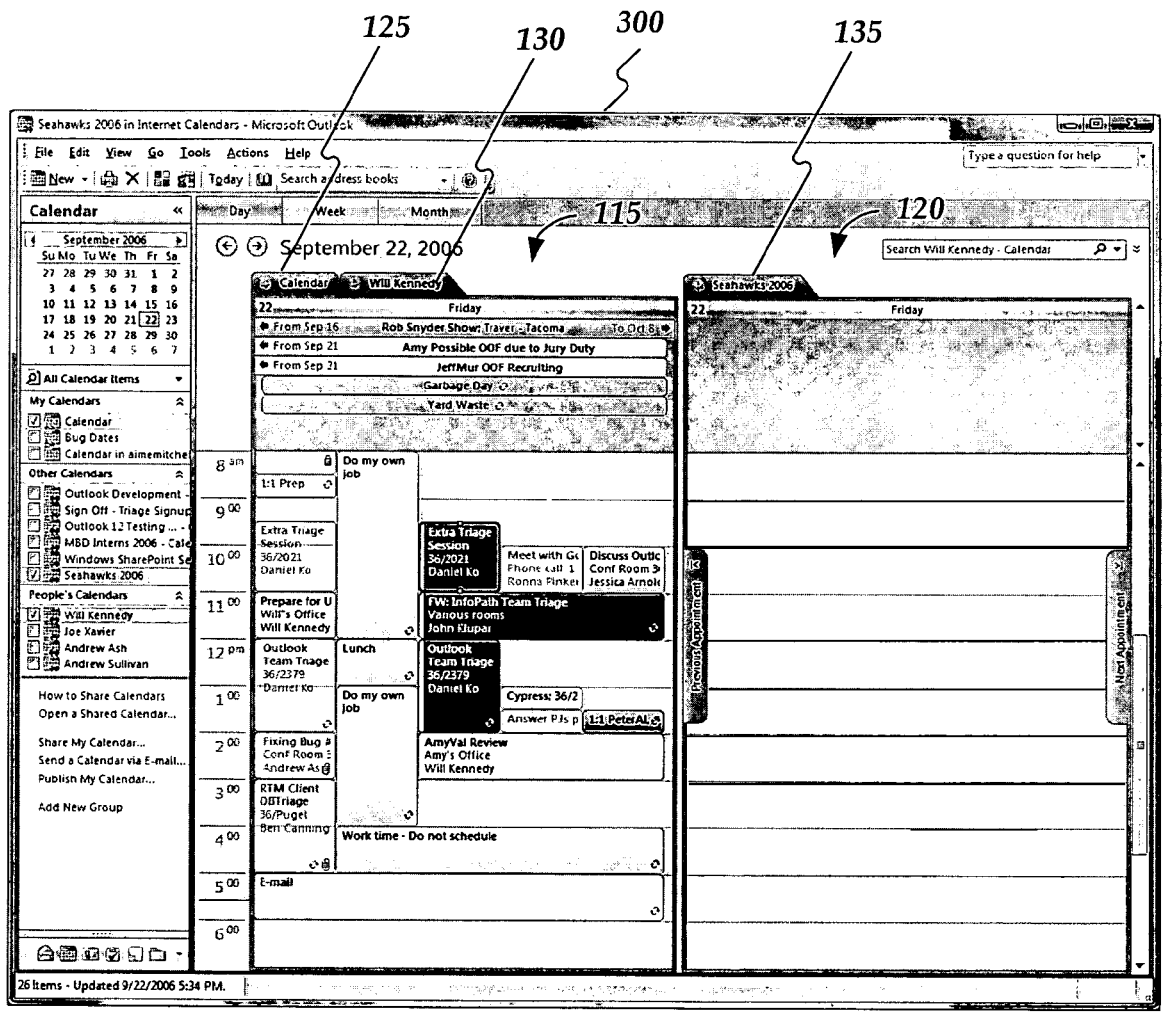
FIG. 3 is a screen shots illustrating a calendar display.

Once computing device 105 enters the selected first entry into first calendar 125 in stage 250, method 200 may continue to stage 260 where computing device 105 may receive a user initiated input selecting an entry on second calendar 130. For example, as shown in FIG. 3, the user may select any entry from second calendar 130. Entries from second calendar 130 may be shown transparently with respect to first calendar 125. Entries from second calendar 130, not being in the forefront, may take on a percent transparency of the color that would otherwise be displayed. In the example above, second calendar 130 (in first area 115) may show all second calendar entries in a faded blue color, for example.

After computing device 105 receive the user initiated input in stage 260, method 200 may proceed to stage 270 where computing device 105 may redisplay, in response to the received user initiated input, second calendar 130 not transparently with respect to first calendar 125. For example, entries from second calendar 130 may no longer take on a percent transparency of the color it would otherwise be displayed.

From stage 270, where computing device 105 redisplays second calendar 130, method 200 may advance to stage 280 where computing device 105 may redisplay, in response to the received user initiated input, first calendar 125 transparently with respect to the redisplayed second calendar 130. In this way, by clicking on an entry in second calendar 130, calendar entries in first calendar 125 may be placed into a faded state (background) and calendar entries in second calendar 130 may be placed in a full color state (foreground).

In addition to second calendar 130, a fourth calendar may be overlaid first calendar 125 and second calendar 130. The fourth calendar's may be displayed transparently so that information from all calendars is visible at one time.$_{[HL1]}$. Once computing device 105 redisplays first calendar 125 in stage 280, method 200 may then end at stage 290.

Embodiments consistent with the invention may comprise a system for displaying calendars. The system may comprise a memory storage and a processing unit coupled to the memory storage. The processing unit may be operative to display a first calendar and to overlay a second calendar over the first calendar. The second calendar may be displayed transparently with respect to the first calendar. In addition, the processing unit may be operative to display a third calendar beside the first calendar.

Other embodiments consistent with the invention may comprise a system for displaying calendars. The system may comprise a memory storage and a processing unit coupled to the memory storage. The processing unit may be operative to receive a first set of inputs respectively identifying a first calendar, a second calendar, and a third calendar. In addition, the processing unit may be operative to receive a second input indicating two of the first calendar, the second calendar, and the third calendar. Moreover, the processing unit may be operative to display, overlaid in a first area, the two calendars indicated by the second input. Furthermore, the processing unit may be operative to display, in a second area, one of the calendars not displayed in the first area selected from the first calendar, the second calendar, and the third calendar.

Yet other embodiments consistent with the invention may comprise a system for displaying calendars. The system may comprise a memory storage and a processing unit coupled to the memory storage. The processing unit may be operative to provide a first area on a display. The first area may be configured to provide a visual comparison of a first calendar to a second calendar by overlaying the first calendar with the second calendar. The second calendar may be displayed transparently with respect to the first calendar. In addition, the processing unit may be operative to provide a second area on the display. The second area may be configured to display a third calendar. The second area may be configured to provide a visual comparison of the overlaid first calendar and second calendar to the third calendar by providing a side-by-side comparison of the overlaid first calendar and second calendar to the third calendar.

Figure 4:
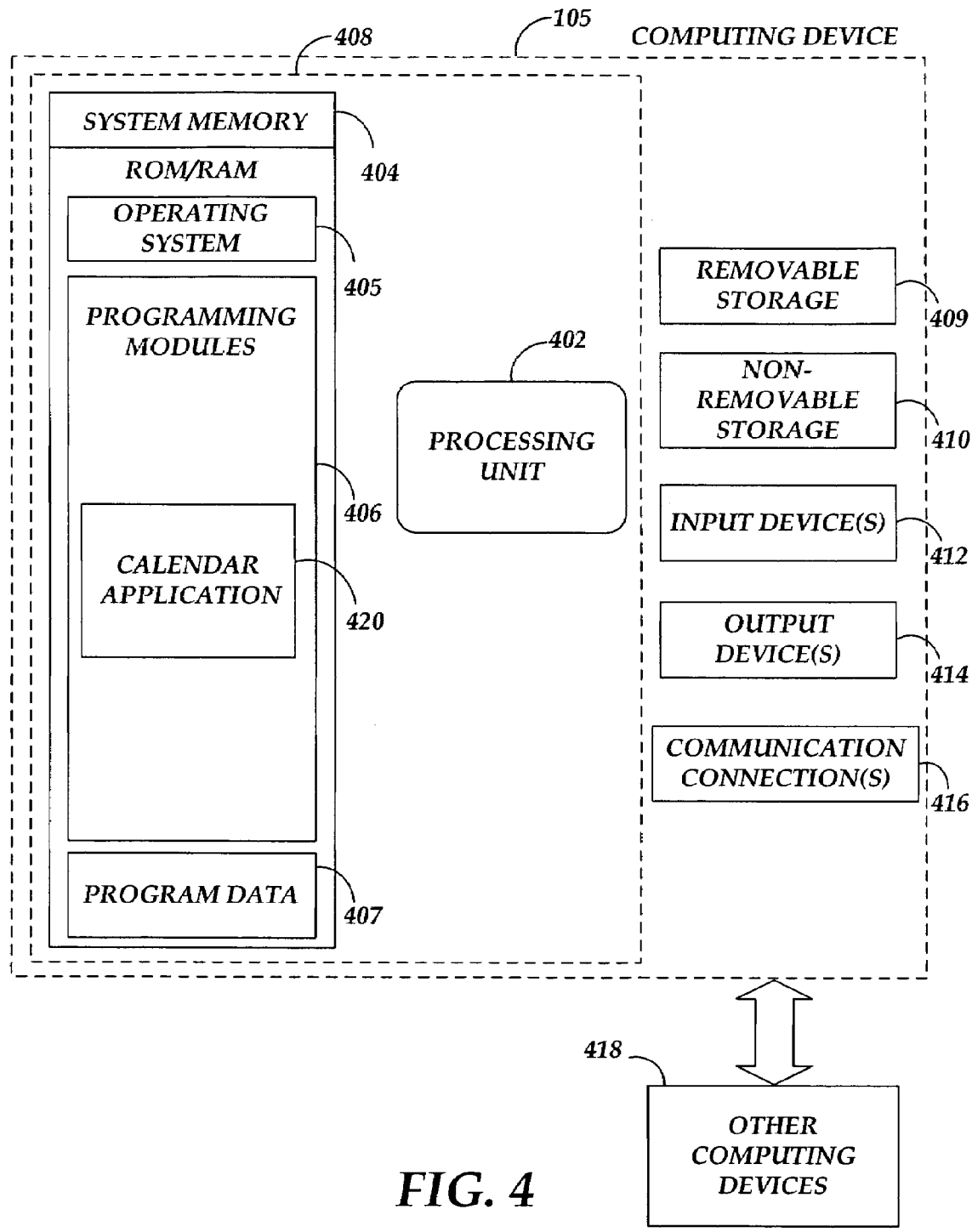
FIG. 4 is a block diagram of a system including a computing device.

FIG. 4 is a block diagram of a system including computing device 105. Consistent with an embodiment of the invention, the aforementioned memory storage and processing unit may be implemented in a computing device, such as computing device 105 of FIG. 4. Any suitable combination of hardware, software, or firmware may be used to implement the memory storage and processing unit. For example, the memory storage and processing unit may be implemented with computing device 105 or any of other computing devices 418, in combination with computing device 105. The aforementioned system, device, and processors are examples and other systems, devices, and processors may comprise the aforementioned memory storage and processing unit, consistent with embodiments of the invention. Furthermore, computing device 105 may comprise an operating environment for system 100 as described above. System 100 may operate in other environments and is not limited to computing device 105.

With reference to FIG. 4, a system consistent with an embodiment of the invention may include a computing device, such as computing device 105. In a basic configuration, computing device 105 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 105's operation. In one embodiment, programming modules 406 may include, for example, calendar application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 105 may have additional features or functionality. For example, computing device 105 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 105. Any such computer storage media may be part of computing device 105. Computing device 105 may also have input device(s) 412 such as a keyboard, a mouse, a pen, a sound input device, a touch input device, etc. Output device (s) 414 such as a display, speakers, a printer, etc. may also be included. The aforementioned devices are examples and others may be used.

Computing device 105 may also contain a communication connection 416 that may allow device 105 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. calendar application 420) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for displaying calendars, the method comprising:
    displaying a first calendar in a first area configured to provide an overlaid calendar representation;
    overlaying a second calendar over the first calendar, wherein overlaying the second calendar over the first calendar comprises displaying the first calendar in a full color state and displaying the second calendar in a faded color state, wherein overlaying the second calendar over the first calendar comprises displaying information from the first calendar and information from the second calendar simultaneously;
    displaying a third calendar in a second area beside the first area, the second area being configured to provide a side-by-side calendar representation; and
    switching, upon user indication, the third calendar with one of the first calendar and the second calendar, wherein switching, upon the user indication, the third calendar with one of the first calendar and the second calendar comprises switching the third calendar from the side-by-side calendar representation to the overlaid calendar representation.

2. The method of claim 1, wherein displaying the first calendar comprises displaying the first calendar in response to an input initiated by a user associated with the first calendar.

3. The method of claim 1, wherein overlaying the second calendar comprises overlaying the second calendar comprising one of the following: an event calendar, a project calendar, and a calendar of another user not associated with the first calendar.

4. The method of claim 1, wherein displaying the third calendar comprises displaying the third calendar comprising one of the following: an event calendar, a project calendar, and a calendar of another user not associated with the first calendar.

5. The method of claim 1, further comprising:
receiving a second user initiated input selecting a first entry from one of the following: the second calendar and the third calendar; and
entering the selected first entry into the first calendar.

6. The method of claim 1, further comprising overlaying a fourth calendar over the first calendar and the second calendar, wherein overlaying the fourth calendar over the first calendar and the second calendar comprises displaying the fourth calendar in the foreground and displaying the first calendar and the second calendar in the background, wherein displaying the first calendar and the second calendar in the background comprises displaying the fourth calendar so that information from the first calendar, information from the second calendar, and information from the fourth calendar is displayed simultaneously.

7. The method of claim 1, wherein displaying the first calendar, the second calendar, and the third calendar comprises displaying at least one downloaded calendar.

8. The method of claim 1, further comprising:
receiving a first user initiated input selecting an entry on the first calendar; and
redisplaying, in response to the received first user initiated input, the second calendar in the full color state and the first calendar in the faded color state.

9. A system for displaying calendars, the system comprising:
a memory storage; and
a processing unit coupled to the memory storage, wherein the processing unit is operative to:
receive a first set of inputs respectively identifying a first calendar, a second calendar, and a third calendar;
receive a second input indicating two of the following calendars to overlay: the first calendar, the second calendar, and the third calendar;
display, overlaid in a first area, the two calendars indicated by the second input, wherein a first one of the two calendars is displayed in a foreground and a second one of the two calendars is displayed in a background;
display, in a second area, one of the following calendars not displayed in the first area: the first calendar, the second calendar, and the third calendar;
receive a third input for switching the one calendar displayed in the second area with one of the two overlaid calendars in the first area; and
switch, in response to the third input, the one calendar displayed in the second area with one of the two overlaid calendars in the first area, wherein the processing unit being operative to switch, in response to the third input, the one calendar displayed in the second area with one of the two overlaid calendars in the first area comprises the processing unit being operative to:
display, in the first area, the one calendar initially displayed in the second area overlaid with a remaining one of the two calendars initial displayed in the first area.

10. The system of claim 9, wherein the first calendar comprises a user's calendar.

11. The system of claim 9, wherein the second calendar comprises one of the following: an event calendar, a project calendar, and a calendar of another user not associated with the first calendar.

12. The system of claim 9, wherein the third calendar comprises one of the following: an event calendar, a project calendar, and a calendar of another user not associated with the first calendar.

13. The system of claim 9, further comprising the processing unit being operative to:
receive a fourth input selecting a second entry from a one of the calendars in the first area; and
enter the selected first entry into another of the calendars in the first area.

14. The system of claim 9, further comprising the processing unit being operative to overlay a fourth calendar in the first area.

15. A computer-readable storage medium which stores a set of instructions which when executed performs a method for displaying calendars, the method executed by the set of instructions comprising:
providing a first area on a display, the first area configured to provide a first visual comparison of a first calendar to a second calendar by overlaying the first calendar with the second calendar, the second calendar being displayed transparently with respect to the first calendar;
providing a second area on the display, the second area configured to display the third calendar and provide a second visual comparison of the overlaid first calendar and second calendar to the third calendar by providing a side-by-side comparison of the overlaid first calendar and second calendar to the third calendar, wherein a user is enabled to switch the third calendar's display to the overlaid first visual comparison display in the first area;
receiving a first user initiated input selecting an entry on the first calendar;
redisplaying, in response to the received first user initiated input, the second calendar in a full color, non-transparent state; and
redisplaying, in response to the received first user initiated input, the first calendar in a faded, transparent state.

16. The computer-readable storage medium of claim 15, wherein providing the first area on the display, the first area configured to provide the first visual comparison of the first calendar to the second calendar, comprises providing the first area on the display wherein the first calendar comprises a user's calendar.

17. The computer-readable storage medium of claim 15, wherein providing the first area on the display, the first area configured to provide the first visual comparison of the first calendar to the second calendar, comprises providing the first area on the display wherein the second calendar comprises one of the following: an event calendar, a project calendar, and a calendar of another user not associated with the first calendar.

18. The computer-readable storage medium of claim 15, wherein providing the second area on the display, the second area configured to display the third calendar, comprises providing the second area on the display, the second area configured to display the third calendar comprising one of the following: an event calendar, a project calendar, and a calendar of another user not associated with the first calendar.

19. The computer-readable storage medium of claim 15, further comprising:
receiving a second user initiated input selecting a first entry from one of the following: the second calendar and the third calendar; and
entering the selected first entry into the first calendar.

20. The computer-readable storage medium of claim 15, further comprising overlaying a fourth calendar over the first calendar and the second calendar, the fourth calendar being displayed transparently with respect to the first calendar and more transparently with respect to the second calendar.

* * * * *